(12) United States Patent
Ganapathy et al.

(10) Patent No.: US 10,977,028 B1
(45) Date of Patent: Apr. 13, 2021

(54) COMPUTER-BASED SYSTEMS CONFIGURED TO GENERATE AND/OR MAINTAIN RESILIENT VERSIONS OF APPLICATION DATA USABLE BY OPERATIONALLY DISTINCT CLUSTERS AND METHODS OF USE THEREOF

(71) Applicant: Capital One Services, LLC, McLean, VA (US)

(72) Inventors: Sohan Ganapathy, Frisco, TX (US); Biraja Mahapatra, McLean, VA (US); Drake Sanderson, Flower Mound, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/749,411

(22) Filed: Jan. 22, 2020

(51) Int. Cl.
*G06F 8/71* (2018.01)
*G06F 9/38* (2018.01)
*G06F 8/65* (2018.01)

(52) U.S. Cl.
CPC ............... *G06F 8/71* (2013.01); *G06F 8/65* (2013.01); *G06F 9/3891* (2013.01)

(58) Field of Classification Search
CPC ............ G06F 8/65; G06F 8/71; G06F 9/3891
See application file for complete search history.

(56) References Cited

U.S. PATENT DOCUMENTS

| 2012/0011398 | A1* | 1/2012 | Eckhardt | G06F 11/2028 714/15 |
|---|---|---|---|---|
| 2017/0169097 | A1* | 6/2017 | Petri | G06F 8/65 |
| 2018/0189328 | A1 | 7/2018 | Frazier et al. | |
| 2018/0278675 | A1 | 9/2018 | Thayer et al. | |
| 2018/0278725 | A1 | 9/2018 | Thayer | |
| 2019/0095230 | A1 | 3/2019 | Glessner et al. | |
| 2019/0123985 | A1 | 4/2019 | Rao et al. | |
| 2019/0171650 | A1 | 6/2019 | Botev et al. | |
| 2019/0278589 | A1* | 9/2019 | Cook | H04L 63/08 |
| 2020/0042312 | A1* | 2/2020 | Kulakovsky | G06F 3/0659 |
| 2020/0073650 | A1* | 3/2020 | Peschansky | G06F 8/65 |

* cited by examiner

*Primary Examiner* — S. Sough
*Assistant Examiner* — Stephen D Berman
(74) *Attorney, Agent, or Firm* — Greenberg Traurig, LLP

(57) ABSTRACT

Systems and methods associated with generating and/or maintaining resilient versions of application data usable by operationally distinct clusters are disclosed. In one embodiment, an exemplary method may comprise operating plural instances of a software application in a first cluster and a second cluster, assessing requirements of streaming architecture of both clusters that impact the instances' ability to process application data, creating at least two versions of the application including a main version in one cluster and a replica version for an operationally distinct cluster, automatically mirroring, in real time, replica versions of the application data from each cluster into a distinct cluster for access and use by the software instance in the distinct cluster, and locally storing indexes for main and replica versions and all data that the software application requires to provide consistent responses in all of the operationally distinct clusters.

20 Claims, 10 Drawing Sheets

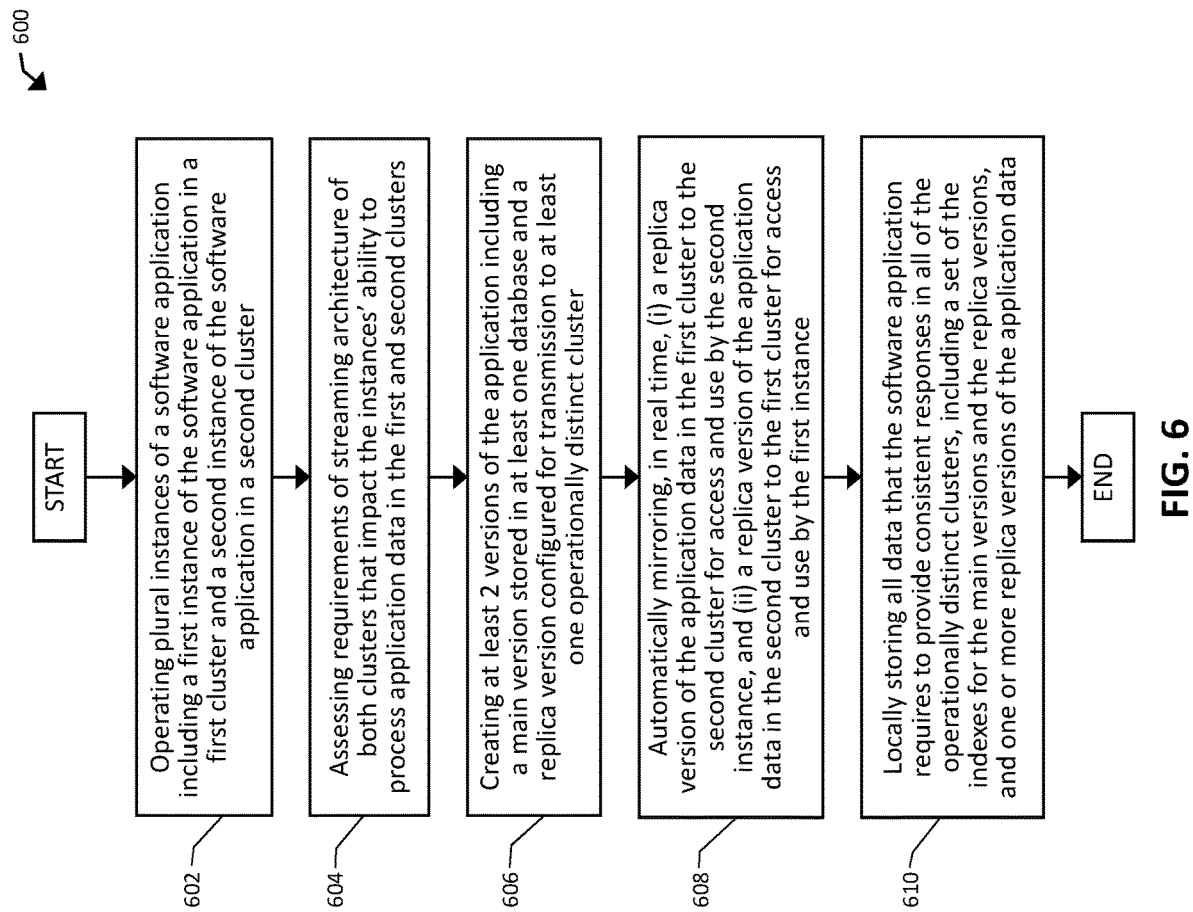

COMPUTER-BASED SYSTEMS CONFIGURED TO GENERATE AND/OR MAINTAIN RESILIENT VERSIONS OF APPLICATION DATA USABLE BY OPERATIONALLY DISTINCT CLUSTERS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to an improved computer-based platform or system, improved computing components and devices and/or improved computing methods configured for one or more novel technological applications involving generating and/or maintaining distinct versions of application data enabling resilient use of software applications via operationally distinct computing clusters.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with data processing, account management, and/or electronic transactions.

SUMMARY OF DESCRIBED SUBJECT MATTER

In some embodiments, the present disclosure provides various exemplary technically improved computer-implemented methods for generating and/or maintaining application data for resiliently operating plural instances of a software application in operationally distinct clusters, including a method having steps such as:
  operating plural instances of a software application comprising:
    operating, by one or more first computers of a first cluster associated with a first cloud computing environment, a first instance of the software application in the first cluster; and
    operating, by one or more second computers of a second cluster associated with a second cloud computing environment, a second instance of the software application in the second cluster;
    wherein the first cluster is operationally distinct from the second cluster;
  assessing, by at least one processor, one or more requirements of streaming architecture of both the first cluster and the second cluster that impact ability of the first instance and the second instance to process versions of application data in both the first cluster and the second cluster;
  creating, by the one or more first computers of the first cluster and by the one or more second computers of the second cluster, at least 2 versions of the application data regarding the software application including a main version stored in at least one database and a replica version configured for transmission to at least one operationally distinct cluster;
  wherein the versions of the application data are:
  (1) indexed as a function of topics that facilitate mirroring the replica version in operationally distinct clusters; and
  (2) aligned based on the one or more requirements such that each replica version:
    (i) mimics the application data and alignments of its respective main version;
    (ii) provides consistent response and mimics same functionality, as the respective main version, when executed by the software application residing in any operationally distinct cluster, wherein the application data of each replica version is configured to produce a same result when executed by the software application in any operationally distinct cluster to provide the consistent response;
  automatically mirroring, in real time:
  (i) by one or both of the one or more first computers and the one or more second computers, the replica version of the application data in the first cluster to the second cluster for access and use by the second instance; and
  (ii) by one or both of the one or more first computers and the one or more second computers, the replica version of the application data in the second cluster to the first cluster for access and use by the first instance;
    locally storing, by the one or more first computers of the first cluster and by the one or more second computers of the second cluster, all data that the software application requires to provide consistent responses in all of the operationally distinct clusters, including: (i) a set of the indexes by which the main versions and the replica versions of the application data are indexed; and (ii) one or more replica versions of the application data that are synchronized; in real time; with current processing of the software application within at least one operationally distinct cluster.

In some embodiments, the present disclosure also provides exemplary technically improved computer-based systems and computer-readable media, including media implemented with and/or involving one or more software applications, whether resident on computer devices or platforms, provided for download via a server and/or executed in connection with at least one network such as via a web browser application, that include or involves features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details

FIG. 6 is a flowchart illustrating one exemplary process related to generating and/or maintaining resilient versions of application data, consistent with exemplary aspects of certain embodiments of the present disclosure.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As explained in more detail, below, systems and methods associated with generating and/or maintaining resilient versions of application data usable by operationally distinct clusters are disclosed. In some embodiments, exemplary methods may involve creating and utilizing software architecture that ensures resiliency in the event of a crash, or similar loss of critical application data, associated with any one cluster. In one embodiment, an exemplary method may comprise: operating plural instances of a software application in a first cluster and a second cluster, assessing requirements of streaming architecture of both clusters that impact the instances' ability to process application data, creating at least 2 versions of the application including a main version in one cluster and a replica version for an operationally distinct cluster, automatically mirroring, in real time, replica versions of the application data from each cluster into a distinct cluster for access and use by the software instance in the distinct cluster, and locally storing indexes for main and replica versions and all data that the software application requires to provide consistent responses in all of the operationally distinct clusters.

Figure 1:
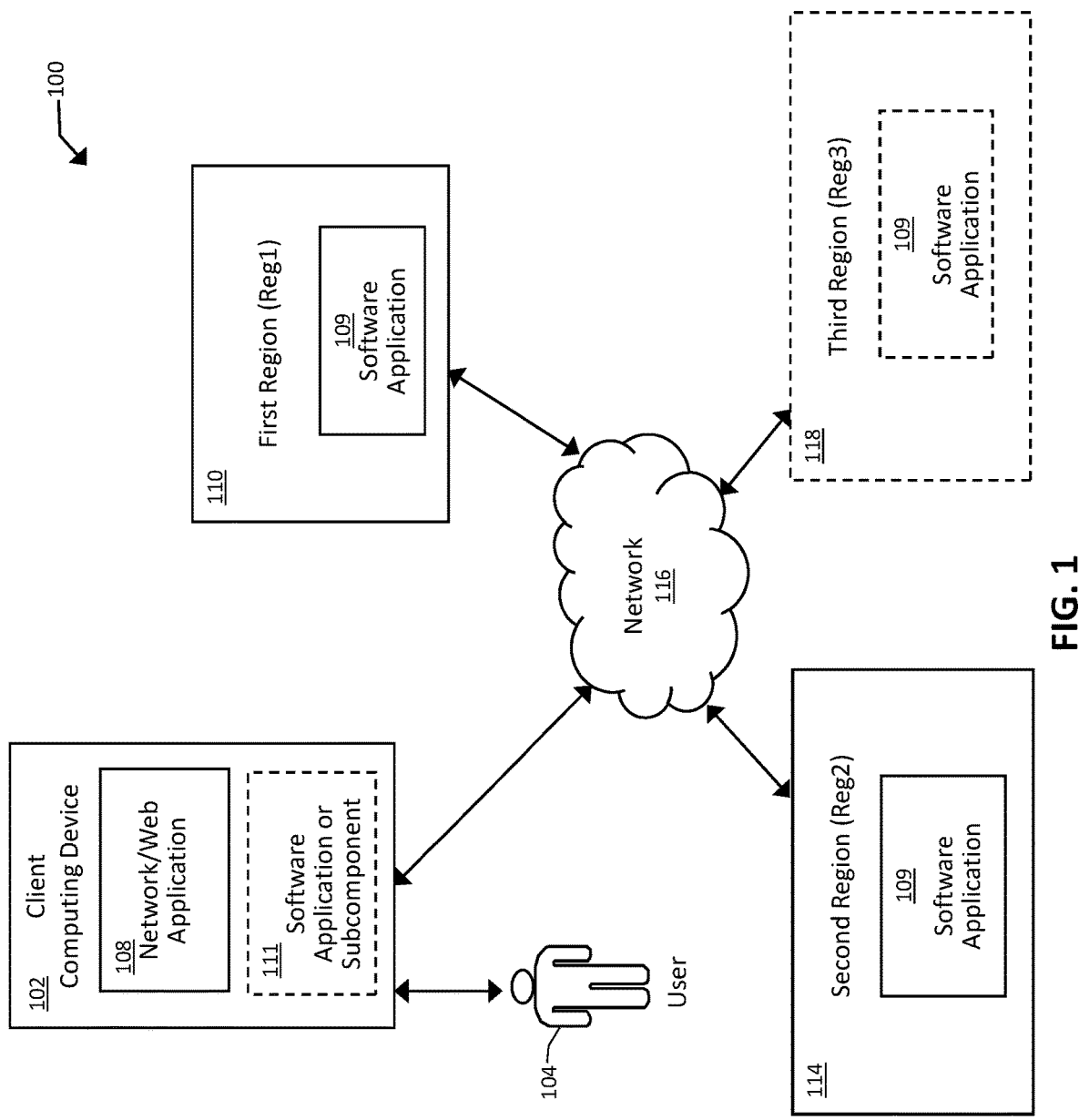
FIG. 1 is a block diagram of an exemplary system and/or platform involving features of generating and/or maintaining resilient versions of application data, consistent with exemplary aspects of certain embodiments of the present disclosure.

FIG. 1 is a block diagram of an exemplary system and/or platform 100 associated with generating and/or maintaining resilient versions of application data for a software application, consistent with disclosed embodiments. System 100 may be configured for executing at least one software applications 109 in plural, operationally-distinct clusters consistent with disclosed embodiments. As shown, system 100 may include a computing device 102, such as a client computing device, associated with a user 104. Computing device 102 may be configured to execute, among other programs, a network/web application 108 and a software application or subcomponent 111 associated with the software application 109 running in different regions, such as a first region 110, a second region 114, a third region 118, and/or other regions. As shown, computing device 102, first region 110, second region 114, third region 118, and other elements (not shown) may be communicatively coupled by a network 116.

While only one computing device 102, software application 109, and network 116 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. Computing device 102 may be one or more computing devices configured to perform operations consistent with executing a software application 109, such as Elasticsearch, executing in a particular region or computing cluster. One illustrative computing device 102 is further described below in connection with FIG. 3.

Network/web application 108 may be one or more software applications configured to perform operations consistent with providing network connections and/or web pages to the user, accessing online accounts or information, as well as searching and obtaining desired information from network and/or web resources, and the like. Here, for example, network/web application 108 may be configured to access various information and/or application data associated with execution of a desired software application. Such processing may occur by or with the network/web application 108, locally, or the network/web application 108 may transmit requests to and/or operate with one or more other software applications and/or computing components to search for and obtain the desired information. Network/web application 108 may also be hosted and/or operated, in whole or in part, by a network/web browser system and/or server, described below in connection with FIG. 2. Network/web application 108 is further described below in connection with FIG. 3.

In some embodiments, the innovations herein may be implemented in connection with a financial service entity that provides, maintains, manages, or otherwise offers financial services. Offering by such financial service entities may entail careful alignment of streaming architecture to feed data into various software applications used, such as Elasticsearch, while closely mirroring necessary information and benefits of any such software application across all instances being executed, especially those executing in operationally distinct manner in separate computing clusters. Such financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art.

Network 116 may be any type of network configured to provide communication between components of system 100. For example, network 116 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
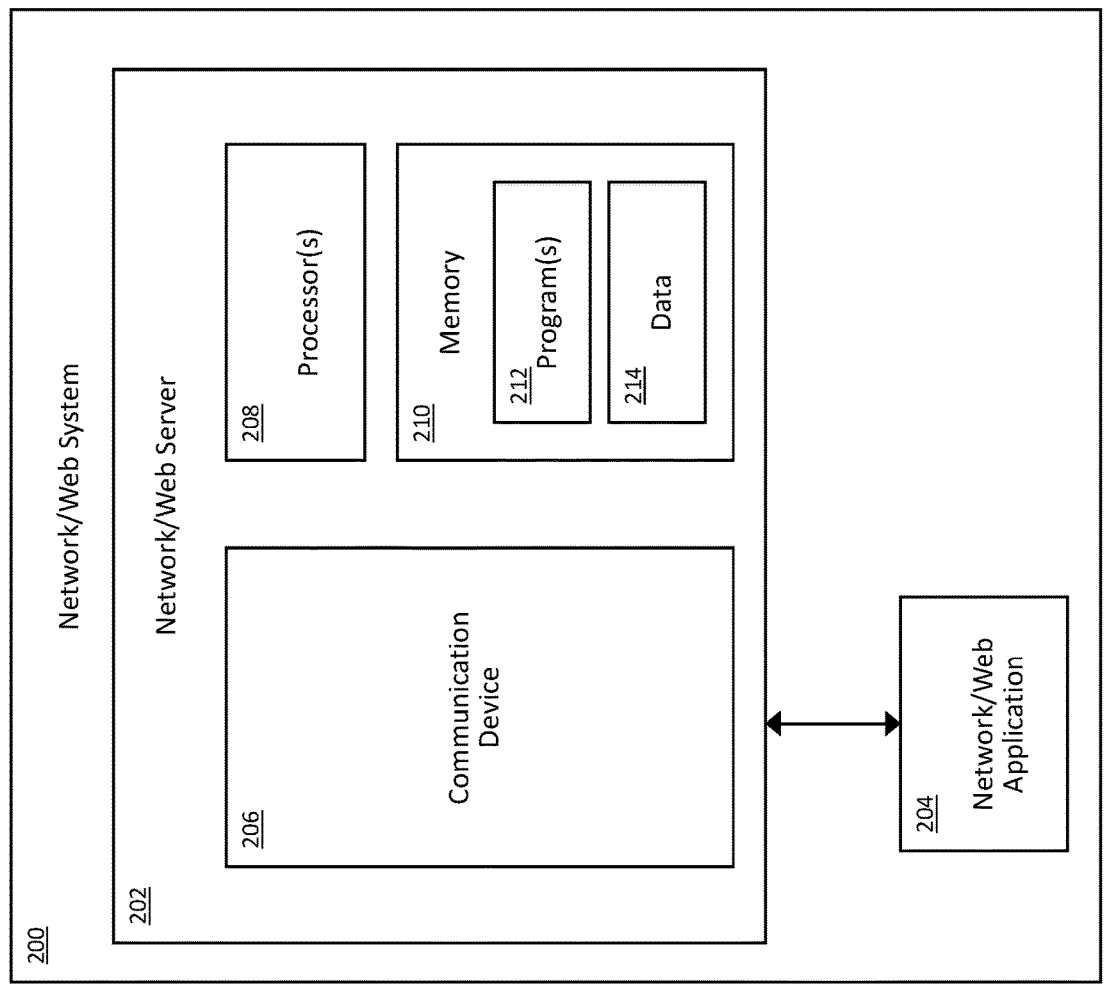
FIG. 2 is a block diagram of an exemplary system and/or platform involving features of generating and/or maintaining resilient versions of application data, consistent with exemplary aspects of certain embodiments of the present disclosure.

FIG. 2 is a block diagram of an exemplary network/web system 200, such as user to connect users 104 with the software application 109, consistent with disclosed embodiments. As shown, network/web system 200 may include network/web server 202 and network/web application 204. Network/web server 202 may include a communication device 206, one or more processor(s) 208, and memory 210 including one or more programs 212 and data 214. Network/web server 202 may be configured to perform operations consistent with providing network/web application 204.

Network/web server 202 may take the form of a server, general purpose computer, mainframe computer, or any combination of these components. Other implementations consistent with disclosed embodiments are possible as well. Network/web application 204 may take the form of one or more software applications stored on a computing device, such as network/web application 108 stored on computing device 102 described above.

Communication device 206 may be configured to communicate with one or more computing devices, such as computing device 102. In some embodiments, communication device 206 may be configured to communicate with the computing device(s) through network/web application 204. Network/web server 202 may, for example, be configured to provide instructions and/or operating information to network/web application 204 through communication device 206. Communication device 206 may be configured to communicate other information as well.

Communication device 206 may be further configured to communicate with one or more computing elements of the cloud computing clusters associated with each of the first region 110, the second region 114, the third region 118, and/or with other components described elsewhere herein. In some embodiments, such as when the cloud computing clusters of plural regions are involved in providing a financial service account like a loan, communication device 206 may be configured to facilitate communicate among the regions to generate, transmit and/or process security-related information or instructions regarding the financial service account associated with a customer or prospective customer. Communication device 206 may be configured to communicate with other components as well.

Processor(s) 208 may include one or more known processing devices, such as a microprocessor from the Core™, Pentium™ or Xeon™ family manufactured by Intel®, the Turion™ family manufactured by AMD™, the "Ax" (i.e., A6 or A8 processors) or "Sx" (i.e. S1, . . . processors) family manufactured by Apple™, or any of various processors manufactured by Sun Microsystems, for example. The disclosed embodiments are not limited to any type of processor(s) otherwise configured to meet the computing demands required of different components of network/web system 200.

Memory 210 may include one or more storage devices configured to store instructions used by processor(s) 208 to perform functions related to disclosed embodiments. For example, memory 210 may be configured with one or more software instructions, such as program(s) 212, that may perform one or more operations when executed by processor(s) 208. The disclosed embodiments are not limited to separate programs or computers configured to perform dedicated tasks. For example, memory 210 may include a single program 212 that performs the functions of network/web system 200, or program(s) 212 may comprise multiple programs. Memory 210 may also store data 214 that is used by program(s) 212.

In certain embodiments, memory 210 may store one or more sets of instructions involved with carrying out aspects of the features and functionality described below. Other instructions are possible as well. In general, instructions may be executed by processor(s) 208 to perform one or more processes consistent with disclosed embodiments. In some embodiments, program(s) 212 may include one or more subcomponents configured to generate and/or process instructions and information for use by network/web application 204 in performing activities associated with accessing software applications, online accounts and/or other resources associated with the present innovations.

The components of network/web system 200 may be implemented in hardware, software, or a combination of both hardware and software, as will be apparent to those skilled in the art. For example, although one or more components of network/web system 200 may be implemented as computer processing instructions, all or a portion of the functionality of network/web system 200 may be implemented instead in dedicated electronics hardware. In some embodiments, network/web system 200 may also be communicatively connected to one or more database(s) (not shown). Alternatively, such database(s) may be located remotely from network/web system 200. Network/web system 200 may be communicatively connected to such database(s) through a network, such as network 116 described above. Such database(s) may include one or more memory devices that store information and are accessed and/or managed through network/web system 200. By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data to the database(s).

Figure 3:
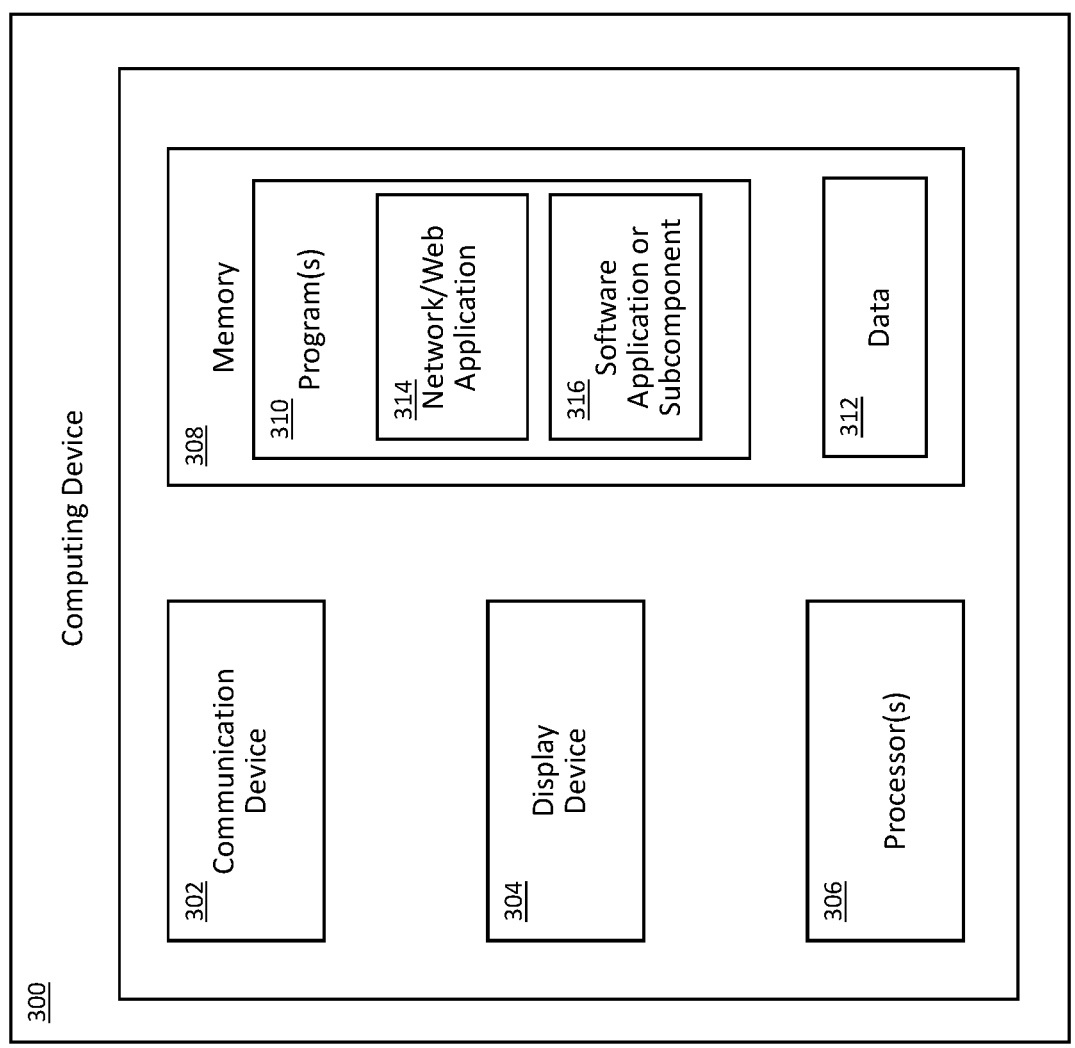
FIG. 3 is a block diagram of an exemplary computing device that may be associated with generating and/or maintaining resilient versions of application data, consistent with exemplary aspects of certain embodiments of the present disclosure.

FIG. 3 is a block diagram of an exemplary computing device 300, consistent with disclosed embodiments. As shown, computing device 300 may include communication device 302, display device 304, processor(s) 306, and memory 308 including program(s) 310 and data 312. Program(s) 310 may include, among others, network/web application 314 and one or more additional software applications or subcomponents 316. In some embodiments, computing device 300 may take the form of a desktop or mobile computing device, such as a desktop computer, laptop computer, smartphone, tablet, or any combination of these components. Other implementations consistent with disclosed embodiments are possible as well. Computing device 300 may, for example, be the same as or similar to computing device 102 described above.

In the example embodiment shown, communication device 302 may be configured to communicate via one or more networks with the various computer systems and servers disclosed elsewhere herein. Communication device 302 may be configured to communicate with other components as well. Communication device 302 may be configured to provide communication over a network, such as network 116 described above. To this end, communication device 302 may include, for example, one or more digital and/or analog devices that allow computing device 300 to communicate with and/or detect other components, such as a network controller and/or wireless adaptor for communicating over one or more networks, including the Internet. Other implementations consistent with disclosed embodiments are possible as well.

Display device 304 may be any display device configured to display interfaces on computing device 300. The interfaces may include, for example, network or web pages provided by computing device 300 through network/web application 108. In some embodiments, display device 304 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 304 may also include one or more digital and/or analog devices that allow a user to interact with computing device 300, such as a touch-sensitive area, keyboard, buttons, or microphones. Other display devices are possible as well. The disclosed embodiments are not limited to any type of display devices otherwise configured to display interfaces.

Processor(s) 306 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor(s) 306 may also include various architectures (e.g., x86 processor, ARM®, etc.). The disclosed embodiments are not limited to any type of processor(s) otherwise configured to meet the computing demands required of different components of computing device 300.

Memory 308 may include one or more storage devices configured to store instructions used by processor(s) 306 to perform functions related to disclosed embodiments. For example, memory 308 may be configured with one or more software instructions, such as program(s) 310, that may perform one or more operations when executed by processor(s) 306. The disclosed embodiments are not limited to separate programs or computers configured to perform dedicated tasks. For example, memory 308 may include a single program 310 that performs the functions of computing device 300, or program(s) 310 may comprise multiple programs. Memory 308 may also store data 312 that is used by program(s) 310. In certain embodiments, memory 308 may store sets of instructions for carrying out some processes performed in connection with FIG. 4. Other instructions are possible as well. In general, instructions may be executed by processor(s) 306 to perform one or more processes consistent with disclosed embodiments.

In some embodiments, program(s) 310 may include a network/web application 314. Network/web application 314 may be executable by processor(s) 306 to perform operations associated with accessing, processing, managing, and/or displaying information associated with the software architecture and functionality disclosed herein. Such information may be provided, for example, via display device 304. Network/web application 314 may be executable by processor(s) 306 to perform other operations as well. In some embodiments, program(s) 310 may further include a software application or subcomponent 316. Software application or subcomponent 316 may, for example, be the same as similar to software application 109 described above. Software application or subcomponent 316 may be executable by processor(s) 306 to perform various operations and/or handle information associated with communications performed via the network/web application 314.

The components of computing device 300 may be implemented in hardware, software, or a combination of both hardware and software, as will be apparent to those skilled in the art. For example, although one or more components of computing device 300 may be implemented as computer processing instructions, all or a portion of the functionality of computing device 300 may be implemented instead in dedicated electronics hardware.

Figure 4:
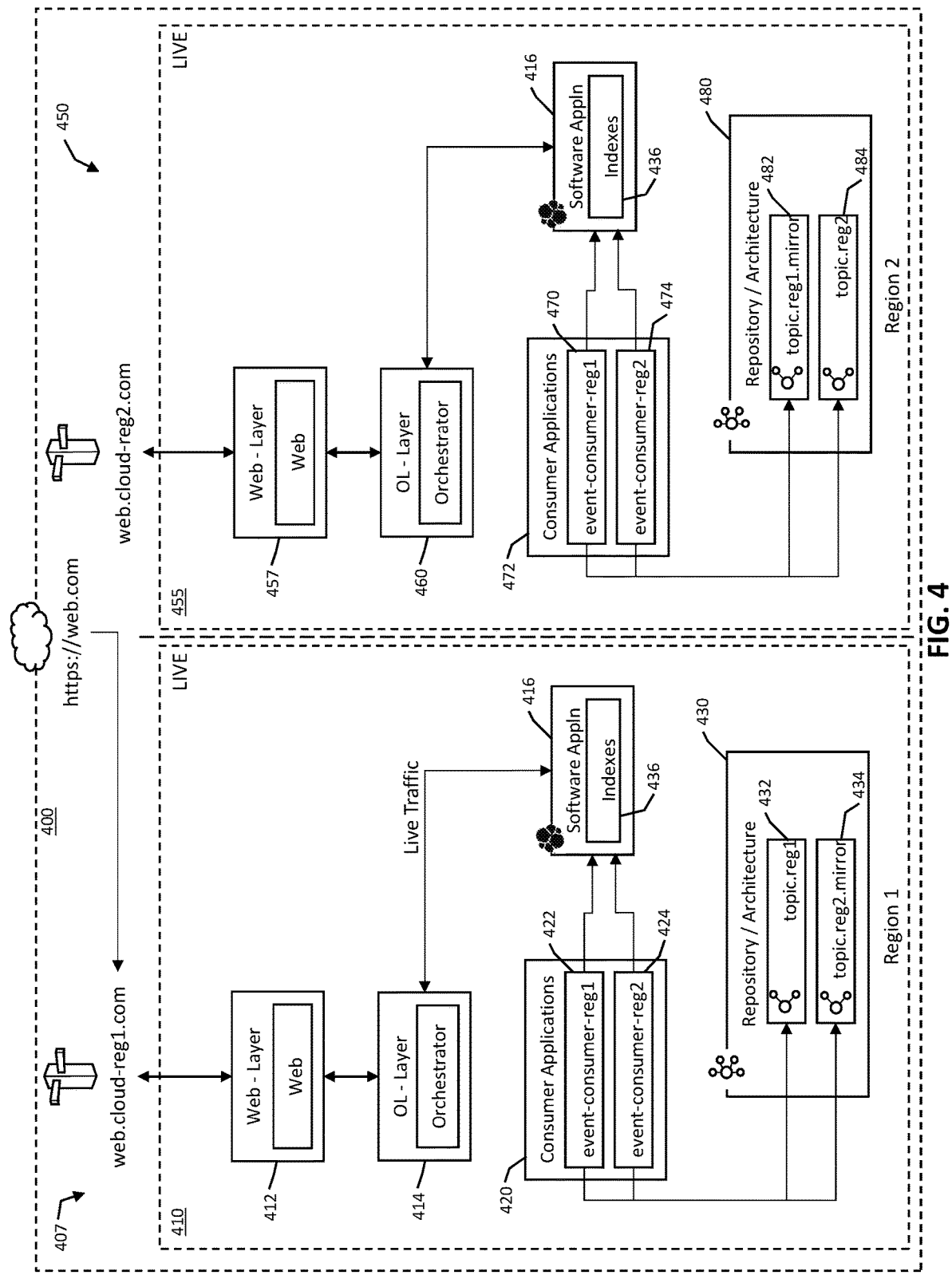
FIG. 4 is a high-level design diagram illustrating an exemplary system and software architecture involved with generating and/or maintaining resilient versions of application data, consistent with exemplary aspects of certain embodiments of the present disclosure.

FIG. 4 is a high-level design diagram illustrating an exemplary system and software architecture involved with generating and/or maintaining resilient versions of application data, consistent with exemplary aspects of certain embodiments of the present disclosure. FIG. 4 illustrates a cloud or web services platform 400, such as AWS (Amazon Web Services), a first region 407 having a first computing cluster 410, and a second region 450 having a second computing cluster 455 that is operationally distinct from the first cluster 410. Referring to FIG. 4, the first region 407 may comprise a Web layer 412 at which web applications reside and/or operate, an orchestration layer 414 at which various orchestration components operate, a software application 416 operating separately in the distinct computing clusters or regions, consumer applications 420 ("consumers") that subscribe to topics and process messages associated with the topics, and at least one repository 430 of application data needed to operate the software application 416. The repository 430 may be a database, another software application, and/or an implementation of streaming architecture such as Apache Kafka. The second region 455 may, similarly, comprise a Web layer 457, an orchestration layer 460, the software application 416, consumers 472, and at least one repository 480 of application data used and needed to mimic the information and benefits of the software application in the various, operationally distinct clusters.

In operation, the software application 416 receives live traffic from the orchestration layer 414, and is accessed or utilized by consumers 420 including one or more first consumers 422 associated with the first region and one or more second consumers 424 associated with the second region. Further, application data needed by consumers to operate the software application, especially in real time, may include application data developed in region 1 as well as application data developed in region 2. Accordingly, the application data stored in the repository 430 may comprise both a main version 432 of the application data developed within that cluster 410 as well as a replica version 434 that is a mirror of the application data developed in the operationally distinct cluster (i.e. 455, here). As described elsewhere herein, the replica version 434 comprises all of the up-to-date data required to achieve all of the benefits of the software application running in the operationally distinct cluster 455, enabling the first region 407 to maintain full replication functionality of the second region 450 in the event of a crash or other failure of the second region 450. The software application 416 is also configured with indexes 436 based on topics that are associated with mirroring versions of the application data in operationally distinct computing clusters. Further, in some embodiments, the main version 432 and the replica version 434 of the application data may be indexed as a function of the topics to facilitate mirroring of the replica version in operationally distinct clusters.

The second cluster 455 within the second region 450 has a generally similar software architecture as that of the first cluster 410, though the second repository 480 has its own main version 484 of the application data developed within that second cluster 455 as well as a replica version 482 that is a mirror of the application data developed in the operationally distinct first cluster (i.e. 410).

Figures 5A, 5B:
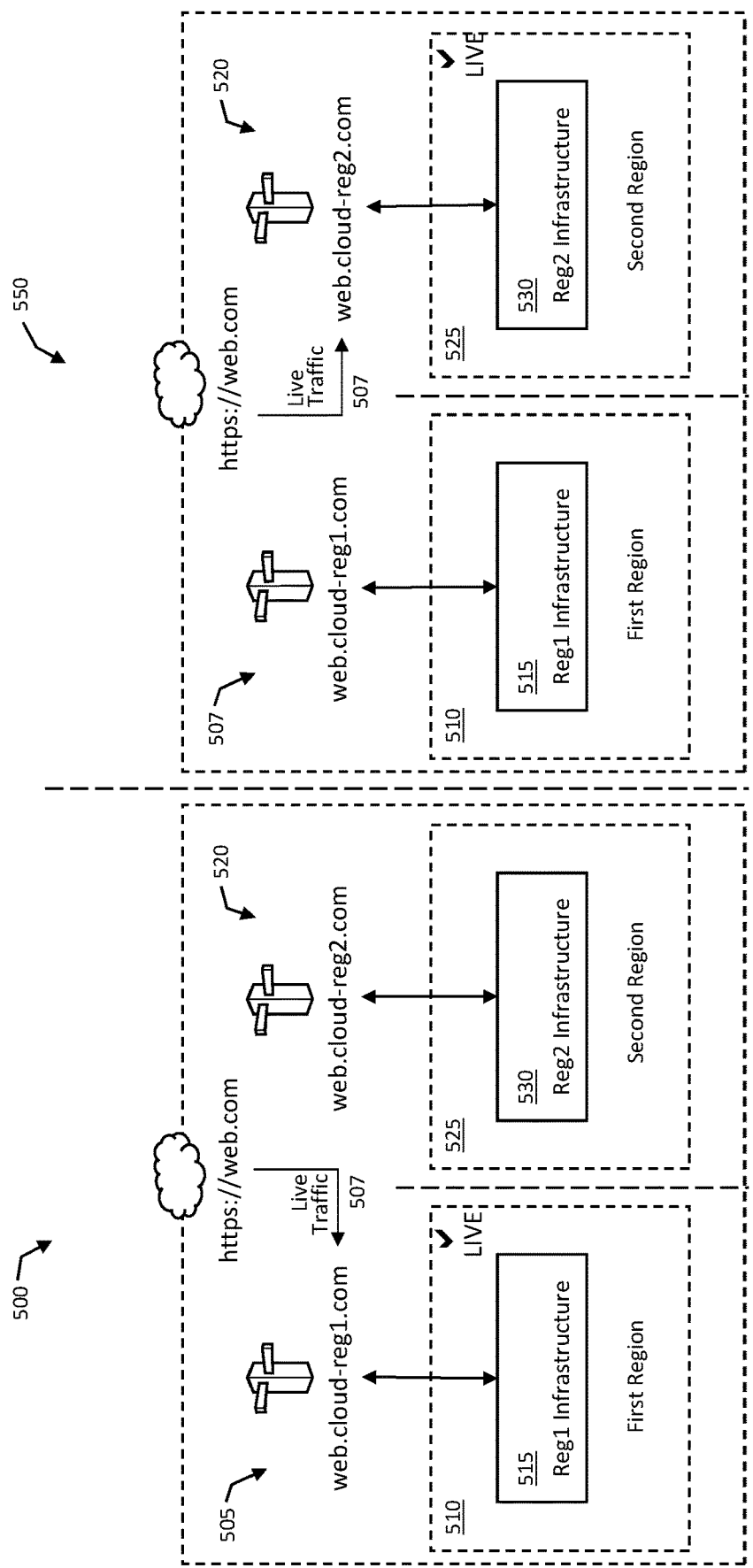
FIGS. 5A-5B are high-level design diagrams illustrating operation of an exemplary system involved with generating and/or maintaining resilient versions of application data, consistent with exemplary aspects of certain embodiments of the present disclosure.

FIGS. 5A-5B are high-level design diagrams illustrating operation of an exemplary system involved with generating and/or maintaining resilient versions of application data, consistent with exemplary aspects of certain embodiments of the present disclosure. Referring to the drawings, FIG. 5A illustrates a first instance 500 of system operation wherein the first region 505 is fully operational and is taking live traffic 507, e.g., from one or more web or cloud services. In this first instance 500, both the first region 505 and the second region 520, as well as their associated first cluster 510 and second cluster 525 are operating normally and consumers 420, 472 from either region may interact with the locally-operating software applications 416 and process topics in a conventional manner, e.g., by directly accessing the software application 416, the main version 432, 484 of the application data within the repository of their respective region, and any replica version 434, 482 of the application data needed.

In this first instance 500 of FIG. 5A, the first infrastructure 515 of the first region 505 and the second infrastructure 530 of the second region 520 receive and handle processing and requests associated with their local software application 416. Live traffic 507 associated with the first region 505 will be routed to the first cluster 510 for handling by the first infrastructure 515.

FIG. 5B illustrates a second instance 550 of system operation wherein the first region 505 has crashed or is otherwise not operational. In this case, the live traffic 507 being generated in the second instance 550 is routed to the second cluster 525 for handling by the second infrastructure 530. In this second instance 550, only the second cluster 525 is operating normally. Accordingly, in addition to performing its normal operations, the second infrastructure 530 is then also tasked with replicating the functionality of the software application resident in the first region 507. In this regard, the application data that is otherwise only available in the first cluster 510 is present in the second cluster 525 as the replica version of the application data, e.g., replica version 482 of FIG. 4.

FIG. 6 is a flowchart illustrating one exemplary process 600 related to generating and/or maintaining versions of application data for resilient execution of plural instances of a software application running in operationally distinct clusters, consistent with exemplary aspects of at least some embodiments of the present disclosure. As shown in the exemplary flowchart of FIG. 6, an illustrative versioning process 600 may comprise: operating plural instances of a software application in a first cluster and a second cluster, at 602; assessing requirements of streaming architecture of both clusters that impact the instances' ability to process application data in the first and second clusters, at 604; creating at least 2 versions of the application including a main version stored in at least one database associated with a first cluster and a replica version configured for use in an operationally distinct cluster, at 606; automatically mirroring, in real time, replica versions of the application data from each cluster into a distinct cluster for access and use by the software instance in the distinct cluster, at 608; and locally storing indexes for main and replica versions and all data that the software application requires to provide consistent responses in all of the operationally distinct clusters, at 610. Further, the versioning process 600 may be carried out, in whole or in part, online, e.g. via a cloud computing environment as described herein.

In some embodiments, versioning process 600 may include, at 602, a step of operating plural instances of a software application. With regard to the disclosed innovations, the step of operating plural instances of the software application may comprise operating an instance (e.g., a first instance) of the software application by a computer (e.g., a first computer); and operating another instance (e.g., a second instance) of the software application by another computer (e.g., a second computer). In implementations, the first computer may comprise one computer, or multiple computers; and the second computer may as well comprise one computer, or multiple computers. According to various disclosed embodiments, such first computer and second computer may be configured to reside in different computing clusters. Here, for example, the first computer may be a computer of a cluster (e.g., the first cluster); and the second computer may be a computer of another cluster (e.g., the second cluster). In some embodiments, the first cluster may be operationally distinct from the second cluster. Further, such first cluster and second cluster may be associated with their respective computing environments. For example, the first cluster may be associated with a first region or cloud computing environment (e.g., a first region); and the second cluster may be associated with a second region or cloud computing environment (e.g., a second region). Here, in one embodiment, the first region and the second region may be implemented on top of two respective VPCs (virtual private clouds). In some implementations, the two respective VPCs may be configured to service two respective regions. Such regions may be geographic regions, e.g., U.S. western region and U.S. eastern region, U.S. region and European region.

Such VPCs may be provided by, for example, Amazon Web Services (AWS) for a financial service entity that utilizes the operation of the instances of the software application. Such financial service entity may include a bank, credit card issuer, or any other type of financial service entity that generates, provides, manages, and/or maintains financial service related offerings, such as loans, or any other type of tasks for one or more customers. In various implementations, the software application may comprise a search application, such as Elasticsearch.

Versioning process 600 may include, at 604, a step of assessing one or more requirements of streaming architecture that impact the ability of the plural instances of the software application to process versions of application data in the first and second clusters. According to various disclosed embodiments, the one or more requirements of streaming architecture may comprise one or more requirements of the streaming architecture of both the first cluster and the second cluster that impact the ability of the first instance and the second instance to process the versions of application data in both the first cluster and the second cluster. With regard to the requirements that impact the ability to process the versions of the application data in both the first cluster and the second cluster, embodiments herein may be configured to assess a condition that causes one or both of the first instance of the software application and the second instance of the software application to become unavailable (e.g., unable to process the versions of the application data). Here, for example, such a condition may include a system down scenario where one of the first cloud computing environment and the second cloud computing environment incurs an operational failure (e.g., system down due to a natural disaster, scheduled maintenances) such that respective one of the first instance of the software application and the second instance of the software application becomes unavailable. In various implementations, step 604 may be performed by at least one processor, such as a processor of the first cluster, a processor of the first cloud computing environment, a processor of the second cluster, a processor of the second cloud computing environment, a processor of a computing environment other than the first cloud computing environment or the second cloud computing environment, and the like.

Further, in some embodiments, the streaming architecture may be provided by a stream-processing platform, such as one implementing Apache Kafka. In various implementations, an Apache Kafka cluster generally maintains feeds of messages in categories that are referred to as topics. Applications that publish messages or events to a Kafka topic are referred to as producers; while applications that subscribe to topics and process the messages associated with the topics are referred to as consumers. Here, for example, one or both of the first instance of the software application and the second instance of the software application may be implemented to receive and process messages from respective Kafka consumers.

Versioning process 600 may also include, at 606, a step of creating at least 2 versions of the application data regarding the software application including a main version stored in at least one database and a replica version configured for use in and/or transmission to at least one operationally distinct cluster. In various disclosed embodiments, the versions of the application data may be created by the first computer of the first cluster and by the second computer of the second cluster. With regard to the disclosed innovations, such versions of the application data may be: (1) indexed as a function of topics that facilitate mirroring the replica version in operationally distinct clusters; and/or (2) aligned based on the one or more requirements. Further, in some examples, the versions of the application data may be aligned based on the one or more requirements such that: (i) each replica version mimics the application data and alignments of its respective main version; and/or (ii) each replica version provides consistent response and mimics same functionality, as the respective main version, when executed by the software application residing in any operationally distinct cluster. In various embodiments, the application data of each replica version may be configured to produce the same result when executed by the software application in any operationally distinct cluster to provide the consistent response.

Further, in some embodiments, both the first cluster and the second cluster may be configured to process at least one main topic for each cluster. In some other embodiments, both the first cluster and the second cluster may be further configured to process at least one secondary topic for each cluster. In those exemplary embodiments, the application data for the at least one main topic of each cluster may be defined and processed as the main versions, and the application data for one or more secondary topics of each cluster may be defined and processed as the replica versions. In various implementations, one or both of the at least one main topic and the one or more secondary topics may correspond to topics of a Kafka cluster described above.

Versioning process 600 may further include, at 608, a step of automatically mirroring, in real time, the replica version of the application data. Here, for example, the step of automatically mirroring in real time may comprise: (i) mirroring, in real time, the replica version of the application data in the first cluster to the second cluster for access and use by the second instance; and/or (ii) mirroring, in real time, the replica version of the application data in the second cluster to the first cluster for access and use by the first instance. Further, implementations herein may be configured such that both of the above described mirroring of the versions of the applications data are performed by one or both of the first computer and the second computer.

Versioning process 600 may still further include, at 610, a step of locally storing all the data that the software application requires to provide consistent responses in all of the operationally distinct clusters. In some embodiments, such data may comprise: (i) a set of the indexes by which the main versions and the replica versions of the application data are indexed; and/or (ii) one or more replica versions of the application data that are synchronized, in real time, with current processing of the software application within at least one operationally distinct cluster.

With regard to the one or more replica versions of the application data being synchronized at step 610, embodiments herein may be configured to synchronize the replica versions of the first cluster with corresponding ones of the main versions of the second cluster; and to synchronize the replica versions of the second cluster with corresponding ones of the main versions of the first cluster. In some implementations, the replica versions of the first cluster are synchronized, in real time, with corresponding ones of the main versions of the second cluster; and the replica versions of the second cluster are synchronized, in real time, with corresponding ones of the main versions of the first cluster.

According to certain embodiments, methods herein may further comprise steps such as storing, for processing with the software application, the main versions of the application data of the first cluster as a first topic, and/or storing, for processing with the software application, the replica versions of the application data of the second cluster as a second topic. In some embodiments, these storing steps may be performed by the first cluster. Such topics may correspond to topics of a Kafka cluster described above.

In other embodiments, the software application operated in each of the first cluster and the second cluster may be (i) configured to be coupled to a local consumer associated with the first cluster in which the software application operates, and a remote consumer associated with the second cluster that is remote, and/or (ii) configured to, in an event that a remote instance of the software application in the second cluster becomes unavailable due to an operational failure of a remote cloud computing environment hosting the second cluster, provide all functionality of the remote instance, i.e., to the consumer normally acting with the failed cluster, in an up-to-date manner using updates mirrored to the software application via a remote consumer instance. In various implementations, one or both of the local consumer associated with the first cluster and the remote consumer associated with the second cluster that is remote may correspond to respective consumers of a Kafka cluster described above.

Moreover, particularly upon the occurrence of the operational failure of the remote cloud computing environment as described above, one or more methods herein may also comprise updating the application data of the second topic with the updated data generated by the software application during the operational failure of the remote cloud computing environment, and/or updating the remote instance with the updated data when the operational failure ends and the remote cloud computing environment becomes operational.

According to certain embodiments, each of the first cluster and the second cluster (e.g., the operationally distinct clusters) may be configured to comprise one or both of a web layer configured to communicate information, in real time, between the operationally distinct clusters, wherein the information includes the replica versions and is utilized to execute the software application, and/or an orchestration layer comprising an orchestrator component that directs the real time information to and from the software application. In some implementations, the web layer may be provided by web portal services, and the orchestrator component may be provided by a service such as AWS cloud formation.

According to various disclosed embodiments, method herein may also comprise one or both of storing, in the data storage by the first cluster, for processing with the software application, the main versions of the application data of the first cluster as a first topic, and/or storing, in the data storage by the first cluster, for processing with the software application, the replica versions of the application data of the second cluster as a second topic.

Moreover, in some embodiments, the orchestrator component as described above may be configured to provide the replica versions of the application data from the second cluster for storage and processing by the software application in real time. Implementations may be configured such that the software application in the first cluster can execute all the processing that requires current data from the second cluster, even when the second cluster experiences a failure in sharing updated application data.

According to various disclosed embodiments, method herein may also comprise synchronizing, in real time, via the orchestrator component, one or both of (i) the replica versions of the first cluster with corresponding ones of the main versions of the second cluster, and/or (ii) the replica versions of the second cluster with corresponding ones of the main versions of the first cluster.

Here, it is noted that the disclosed systems, platforms, methods, and computer-readable media include or involve a versioning mechanism that may include and/or involve a cloud computing environment configured to perform various automated functionality set forth herein. Unlike conventional software and solutions, the present innovations may utilize an improved cloud computing environment that may, via the creation of the versions of the application data as well as the mirroring and storing thereof in real time, be configured to fail over the operation of an software application from one cloud computing environment to another cloud computing environment, in real time, upon the occurrence of an operational failure of the cloud computing environment in which the software application operates. In these and other manners, implementations involving the cloud computing environment empowered with disclosed versioning mechanism represent an improvement over conventional cloud computing environments.

The disclosed mechanism of versioning software application instances across cloud regions improves utilization of both processing and recovering resources, such as by assessing the requirements of the streaming architecture of the cloud computing environments, creating the version of the application data, and mirroring and storing thereof in real time across cloud computing environments. Moreover, the improved cloud computing environment enabled by the disclosed versioning mechanisms improves efficiency, reliability, consistency and fault-tolerance ability of the operation of software applications; and reduces likelihood of user exposure to and risks associated with "downtime," as well as likelihood of system data inconsistency caused by operation failures of the cloud computing environment in which the software applications operate, thereby reducing or eliminating unnecessary disruption of businesses that are based on the operation of the software applications.

Figure 7:
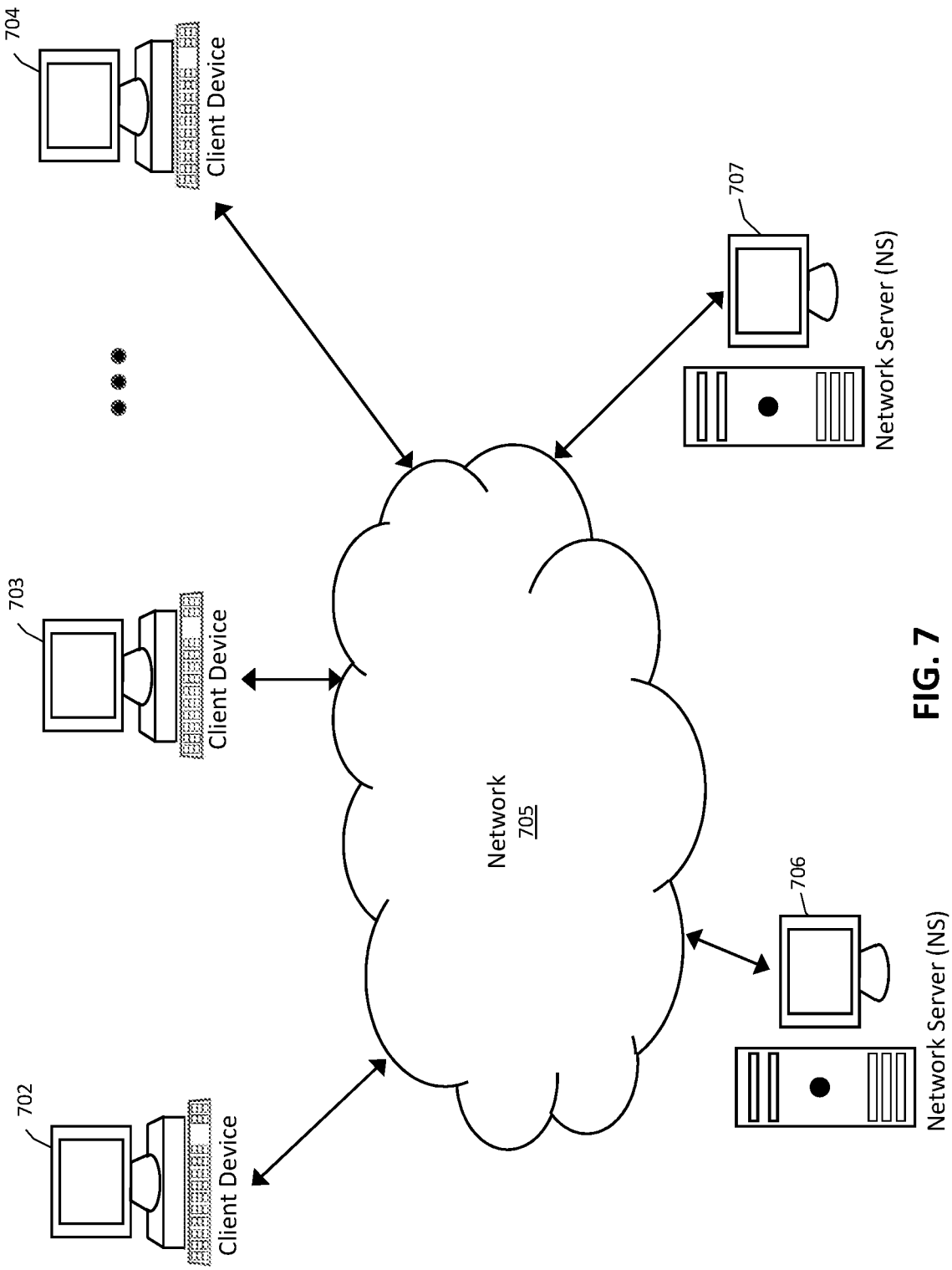
FIG. 7 is a block diagram depicting an exemplary computer-based system and/or platform, in accordance with certain embodiments of the present disclosure.

FIG. 7 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 7, members 702-704 (e.g., clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 1, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 8:
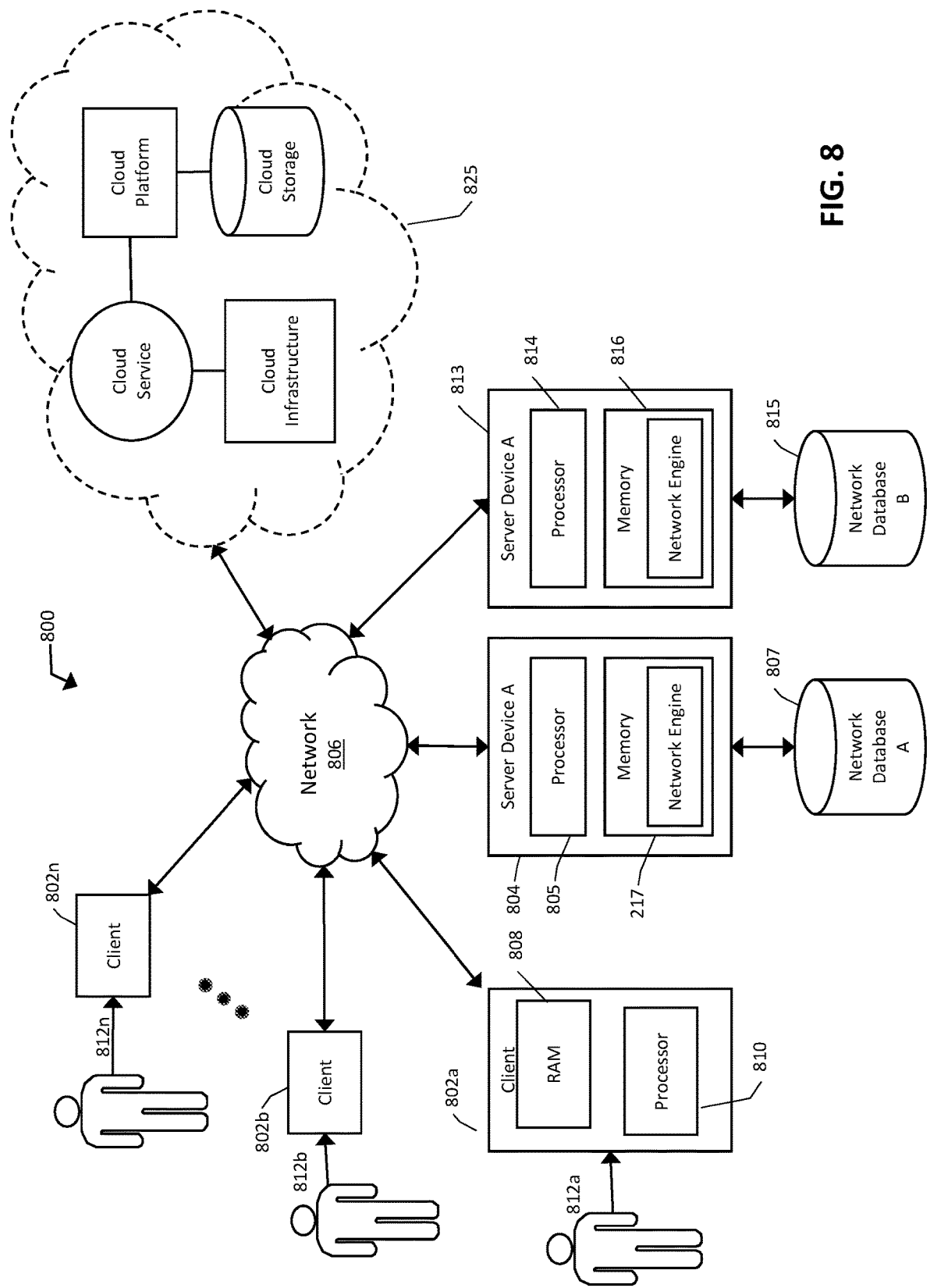
FIG. 8 is a block diagram depicting another exemplary computer-based system and/or platform, in accordance with certain embodiments of the present disclosure.

FIG. 8 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 802a, 802b thru 802n shown each at least includes a computer-readable medium, such as a random-access memory (RAM) 808 coupled to a processor 810 or FLASH memory. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802*a* through 802*n* may also comprise a number of external or internal devices such as a mouse, a CD-ROM, DVD, a physical or virtual keyboard, a display, or other input or output devices. In some embodiments, examples of member computing devices 802*a* through 802*n* (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802*a* through 802*n* may be specifically programmed with one or more application programs in accordance with one or more principles/methodologies detailed herein. In some embodiments, member computing devices 802*a* through 802*n* may operate on any operating system capable of supporting a browser or browser-enabled application, such as Microsoft™ Windows™, and/or Linux. In some embodiments, member computing devices 802*a* through 802*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802*a* through 802*n*, users, 812*a* through 812*n*, may communicate over the exemplary network 806 with each other and/or with other systems and/or devices coupled to the network 806. As shown in FIG. 8, exemplary server devices 804 and 813 may be also coupled to the network 806. In some embodiments, one or more member computing devices 802*a* through 802*n* may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 9:
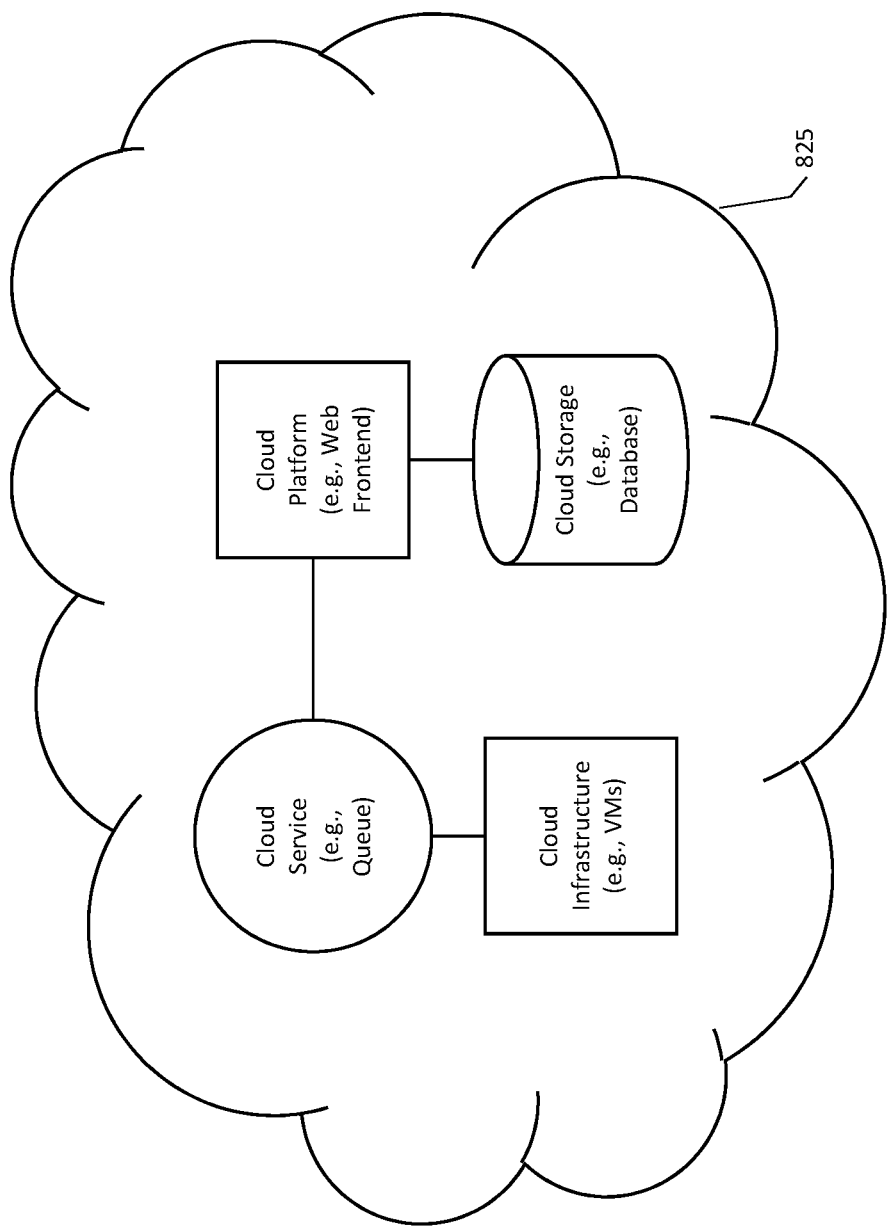
FIGS. 9 and 10 are diagrams illustrating two exemplary implementations of cloud computing architecture/aspects with respect to which the disclosed technology may be specifically configured to operate, in accordance with certain embodiments of the present disclosure.

As also shown in FIGS. 8 and 9, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

Figure 10:
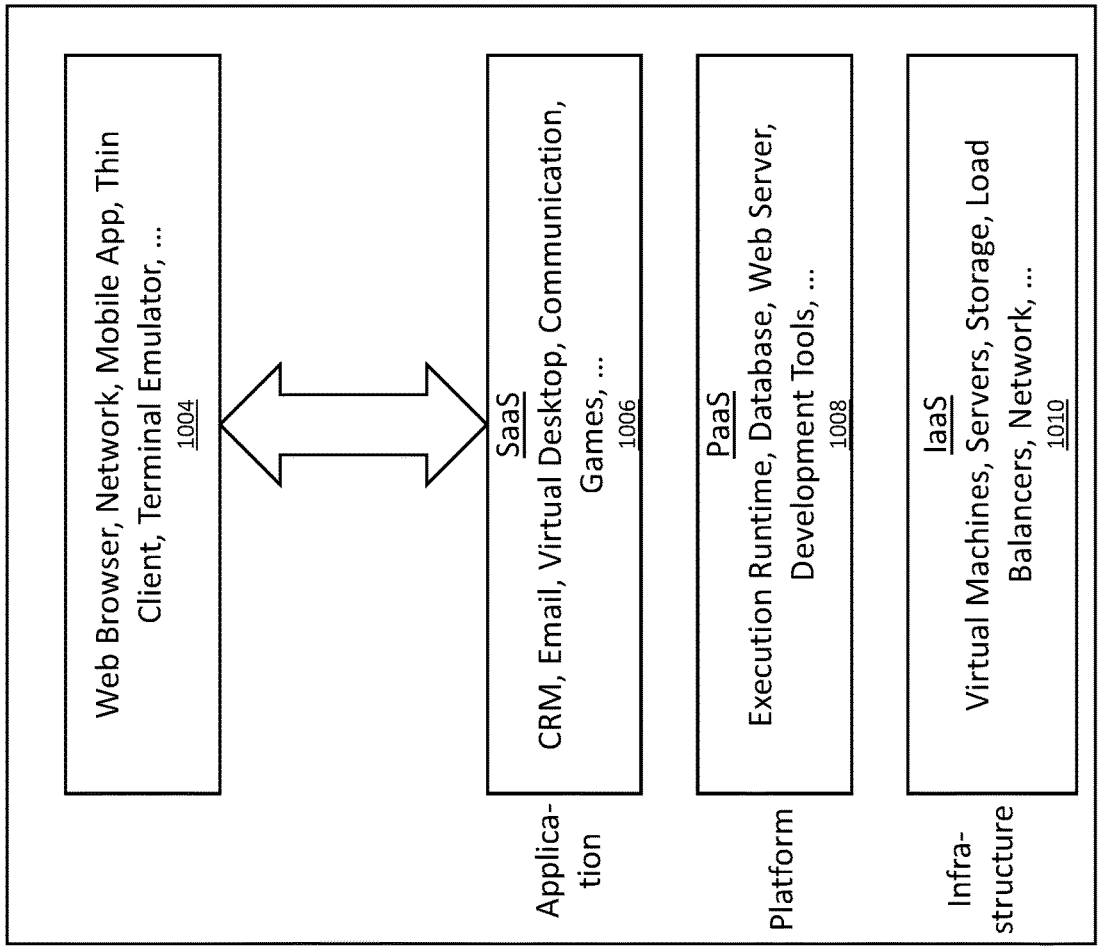

According to some embodiments shown by way of one example in FIG. 10, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. FIGS. 9 and 10 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.). Computer-related systems, computer systems, and systems, as used herein, include any combination of hardware and software.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 3-4) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A computer-implemented method comprising:
operating plural instances of a software application comprising:
operating, by one or more first computers of a first cluster associated with a first cloud computing environment, a first instance of the software application in the first cluster; and
operating, by one or more second computers of a second cluster associated with a second cloud computing environment, a second instance of the software application in the second cluster;
wherein the first cluster is operationally distinct from the second cluster;
assessing, by at least one processor, one or more requirements of streaming architecture of both the first cluster and the second cluster that impact ability of the first instance and the second instance to process versions of application data in both the first cluster and the second cluster;
creating, by the one or more first computers of the first cluster and by the one or more second computers of the second cluster, at least 2 versions of the application data regarding the software application including a main version stored in at least one database and a replica version configured for use in or transmission to at least one operationally distinct cluster;
wherein the versions of the application data are:
(1) indexed as a function of topics that facilitate mirroring the replica version in operationally distinct clusters; and
(2) aligned based on the one or more requirements such that each replica version:
(i) mimics the application data and alignments of its respective main version;
(ii) provides consistent response and mimics same functionality, as the respective main version, when executed by the software application residing in any operationally distinct cluster, wherein the application data of each replica version is configured to produce a same result when executed by the software application in any operationally distinct cluster to provide the consistent response;
automatically mirroring, in real time:
(i) by one or both of the one or more first computers and the one or more second computers, the replica version of the application data in the first cluster to the second cluster for access and use by the second instance; and
(ii) by one or both of the one or more first computers and the one or more second computers, the replica version of the application data in the second cluster to the first cluster for access and use by the first instance;
locally storing, by the one or more first computers of the first cluster and by the one or more second computers of the second cluster, all data that the software application requires to provide consistent responses in all of the operationally distinct clusters, including: (i) a set of the indexes by which the main versions and the replica versions of the application data are indexed; and (ii) one or more replica versions of the application data that are synchronized, in real time, with current processing of the software application within at least one operationally distinct cluster.

Clause 2. The method of clause 1 or consistent with any clause herein, wherein both the first cluster and the second cluster are configured to process at least one main topic for each cluster, wherein the application data for the at least one main topic of each cluster are defined and processed as the main versions, and the application data for one or more secondary topics of each cluster are defined and processed as the replica versions.

Clause 3. The method of clause 1 or consistent with any clause herein, wherein the replica versions of the first cluster are synchronized in real time with corresponding ones of the main versions of the second cluster, and the replica versions of the second cluster are synchronized in real time with corresponding ones of the main versions of the first cluster.

Clause 4. The method of clause 1 or consistent with any clause herein, further comprising:
storing, by the first cluster, for processing with the software application, the main versions of the application data of the first cluster as a first topic; and
storing, by the first cluster, for processing with the software application, the replica versions of the application data of the second cluster as a second topic.

Clause 5. The method of clause 4 or consistent with any clause herein, wherein the software application, in each cluster, is:
(i) coupled to a local consumer associated with the first cluster in which the software application operates, and a remote consumer associated with the second cluster that is remote; and
(ii) configured to, in an event that a remote instance of the software application in the second cluster becomes unavailable due to an operational failure of a remote cloud computing environment hosting the second cluster, provide all functionality of the remote instance (e.g., to the consumer normally acting with the failed cluster) in an up-to-date manner using updates mirrored to the software application via a remote consumer instance.

Clause 6. The method of clause 5 or consistent with any clause herein, further comprising, upon occurrence of the operational failure of the remote cloud computing environment:
updating the application data of the second topic with updated data generated by the software application during the operational failure of the remote cloud computing environment; and
updating the remote instance with the updated data when the operational failure ends and the remote cloud computing environment becomes operational.

Clause 7. The method of clause 1 or consistent with any clause herein, wherein each of the operationally distinct clusters comprises:
a web layer configured to communicate information, in real time, between the operationally distinct clusters, wherein the information includes the replica versions and is utilized to execute the software application; and
an orchestration layer comprising an orchestrator component that directs the real time information to and from the software application.

Clause 8. The method of clause 6 or consistent with any clause herein, further comprising:
   storing, in data storage by the first cluster, for processing with the software application, the main versions of the application data of the first cluster as a first topic; and
   storing, in the data storage by the first cluster, for processing with the software application, the replica versions of the application data of the second cluster as a first topic.

Clause 9. The method of clause 7 or consistent with any clause herein, wherein the orchestrator component provides the replica versions of the application data from the second cluster for storage and processing by the software application in real time, such that the software application in the first cluster can execute all processing requiring current data from the second cluster, even when the second cluster experiences a failure in sharing updated application data.

Clause 10. The method of clause 6 or consistent with any clause herein, further comprising:
   synchronizing, in real time, via the orchestrator component: (i) the replica versions of the first cluster with corresponding ones of the main versions of the second cluster, and (ii) the replica versions of the second cluster with corresponding ones of the main versions of the first cluster.

Clause 11. A computer-implemented method comprising:
   operating plural instances of a search application comprising:
      operating, by one or more first computers of a first cluster associated with a first cloud computing environment, a first instance of the search application in the first cluster; and
      operating, by one or more second computers of a second cluster associated with a second cloud computing environment, a second instance of the search application in the second cluster;
      wherein the first cluster is operationally distinct from the second cluster;
   assessing, by at least one processor, one or more requirements of streaming architecture of both the first cluster and the second cluster that impact ability of the first instance and the second instance to process versions of application data in both the first cluster and the second cluster;
   creating, by the one or more first computers of the first cluster and by the one or more second computers of the second cluster, at least 2 versions of the application data regarding the search application including a main version stored in at least one database and a replica version configured for transmission to at least one operationally distinct cluster;
   storing, by the first cluster, for processing with the software application, the main versions of the application data of the first cluster as a first topic; and
   storing, by the first cluster, for processing with the software application, the replica versions of the application data of the second cluster as a second topic.
      wherein the versions of the application data are:
         (1) indexed as a function of topics that facilitate mirroring the replica version in operationally distinct clusters; and
         (2) aligned based on the one or more requirements such that each replica version:
            (i) mimics the application data and alignments of its respective main version;
            (ii) provides consistent response and mimics same functionality, as the respective main version, when executed by the search application residing in any operationally distinct cluster, wherein the application data of each replica version is configured to produce a same result when executed by the search application in any operationally distinct cluster to provide the consistent response;
   automatically mirroring, in real time:
      (i) by one or both of the one or more first computers and the one or more second computers, the replica version of the application data in the first cluster to the second cluster for access and use by the second instance; and
      (ii) by one or both of the one or more first computers and the one or more second computers, the replica version of the application data in the second cluster to the first cluster for access and use by the first instance;
   locally storing, by the one or more first computers of the first cluster and by the one or more second computers of the second cluster, all data that the search application requires to provide consistent responses in all of the operationally distinct clusters, including: (i) a set of the indexes by which the main versions and the replica versions of the application data are indexed; and (ii) one or more replica versions of the application data that are synchronized, in real time, with current processing of the search application within at least one operationally distinct cluster.

Clause 12. The method of clause 11 or consistent with any clause herein, wherein both the first cluster and the second cluster are configured to process at least one main topic for each cluster, wherein the application data for the at least one main topic of each cluster are defined and processed as the main versions, and the application data for one or more secondary topics of each cluster are defined and processed as the replica versions.

Clause 13. The method of clause 11 or consistent with any clause herein, wherein the replica versions of the first cluster are synchronized in real time with corresponding ones of the main versions of the second cluster, and the replica versions of the second cluster are synchronized in real time with corresponding ones of the main versions of the first cluster.

Clause 14. The method of clause 11 or consistent with any clause herein, wherein the software application, in each cluster, is:
   (i) coupled to a local consumer associated with the first cluster in which the software application operates, and a remote consumer associated with the second cluster that is remote; and
   (ii) configured to, in an event that a remote instance of the software application in the second cluster becomes unavailable due to an operational failure of a remote cloud computing environment hosting the second cluster, provide all functionality of the remote instance (e.g., to the consumer normally acting with the failed cluster) in an up-to-date manner using updates mirrored to the software application via a remote consumer instance.

Clause 15. The method of clause 14 or consistent with any clause herein, further comprising, upon occurrence of the operational failure of the remote cloud computing environment:
   updating the application data of the second topic with updated data generated by the software application during the operational failure of the remote cloud computing environment; and updating the remote instance with the updated data when the operational failure ends and the remote cloud computing environment becomes operational.

Clause 16. The method of clause 11 or consistent with any clause herein, wherein each of the operationally distinct clusters comprises:
 a web layer configured to communicate information, in real time, between the operationally distinct clusters, wherein the information includes the replica versions and is utilized to execute the software application; and
 an orchestration layer comprising an orchestrator component that directs the real time information to and from the software application.

Clause 17. The method of clause 16 or consistent with any clause herein, wherein the orchestrator component provides the replica versions of the application data from the second cluster for storage and processing by the software application in real time, such that the software application in the first cluster can execute all processing requiring current data from the second cluster, even when the second cluster experiences a failure in sharing updated application data.

Clause 18. The method of clause 16 or consistent with any clause herein, further comprising:
 synchronizing, in real time, via the orchestrator component: (i) the replica versions of the first cluster with corresponding ones of the main versions of the second cluster, and (ii) the replica versions of the second cluster with corresponding ones of the main versions of the first cluster.

Clause 19. Embodiments herein may also take the form of a system comprised of computing elements that are arranged, programmed and/or otherwise adapted to perform the features and functionality set forth anywhere above. Such computing elements may include and/or involve computer readable media.

Clause 20. In addition, embodiments herein may also take the form of one or more computer readable media containing computer-executable instructions for performing any of the processing herein, the computer-executable instructions being executable via one or more processing components to process instructions and/or perform one or more aspects of the functionality set forth herein.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method comprising: operating plural instances of a software application comprising:
 operating, by one or more first computers of a first cluster associated with a first cloud computing environment, a first instance of the software application in the first cluster; and
 operating, by one or more second computers of a second cluster associated with a second cloud computing environment, a second instance of the software application in the second cluster;
 wherein the first cluster is operationally distinct from the second cluster;
 assessing, by at least one processor, one or more requirements of streaming architecture of both the first cluster and the second cluster that impact ability of the first instance and the second instance to process versions of application data in both the first cluster and the second cluster;
 creating, by the one or more first computers of the first cluster and by the one or more second computers of the second cluster, respectively, at least two versions of the application data regarding the software application, the at least two versions of the application data including a first main version stored in at least one first database and a first replica version configured for transmission to one or more operationally distinct clusters, and a second main version stored in at least one second database and a second replica version configured for transmission to at least one of the one or more operationally distinct clusters;
 wherein the at least two versions of the application data are:
  (1) indexed as a function of topics that facilitate mirroring the first replica version and the second replica version in the one or more operationally distinct clusters; and
  (2) aligned based on the one or more requirements such that each of the first replica version and the second replica version:
   (i) mimics the application data and alignments of the first main version and the second main version, respectively;
   (ii) provides consistent response and mimics a same functionality, as the first main version and the second main version, respectively, when executed by a respective instance of the software application residing in any of the one or more operationally distinct clusters, wherein the application data of each of the first replica version and the second replica version is configured to produce a same result when executed by a respective instance of the software application in any of the one or more operationally distinct clusters to provide the consistent response;
 automatically mirroring, in real time:
  (i) by one or both of the one or more first computers and the one or more second computers, the first replica version of the application data in the first cluster to the second cluster for access and use by the second instance; and
  (ii) by one or both of the one or more first computers and the one or more second computers, the second replica version of the application data in the second cluster to the first cluster for access and use by the first instance;
 locally storing, by the one or more first computers of the first cluster and by the one or more second computers of the second cluster, all data that the software application requires to provide consistent responses in the one or more operationally distinct clusters, including:
  (i) a set of indexes by which the first and second main versions and the first and second replica versions of the application data are indexed;
  and (ii) one or more of the first and second replica versions of the application data that are synchronized, in real time, with current processing of one or more of the first and second main versions within the one or more operationally distinct clusters.

2. The method of claim 1 wherein both the first cluster and the second cluster are configured to process at least one main topic for each cluster, wherein application data for the at least one main topic of each cluster are defined and processed as one or more main versions, and the application data for one or more secondary topics of each cluster are defined and processed as one or more replica versions.

3. The method of claim 1 wherein the second replica version mirrored in the first cluster is synchronized in real time with the second main version of the second cluster, and the first replica version mirrored in the second cluster is synchronized in real time with the first main version of the first cluster.

4. The method of claim 1 further comprising:
storing, by the first cluster, for processing with the software application, the first main version of the application data of the first cluster as a first topic; and
storing, by the first cluster, for processing with the software application, the second replica version of the application data of the second cluster as a second topic.

5. The method of claim 4 wherein the software application, in each cluster, is:
(i) coupled to a local consumer associated with the first cluster, and a remote consumer associated with the second cluster that is remote; and
(ii) configured to, in an event that a remote instance of the software application in the second cluster becomes unavailable due to an operational failure of a remote cloud computing environment hosting the second cluster, provide all functionality of the remote instance in an up-to-date manner using updates mirrored to the software application via a remote consumer instance.

6. The method of claim 5 further comprising, upon occurrence of the operational failure of the remote cloud computing environment:
updating application data of the second topic with updated data generated by the software application during the operational failure of the remote cloud computing environment; and
updating the remote instance with the updated data when the operational failure ends and the remote cloud computing environment becomes operational.

7. The method of claim 1 wherein each of the operationally distinct clusters comprises:
a web layer configured to communicate information, in real time, between the operationally distinct clusters, wherein the information includes the first and second replica versions and is utilized to execute the software application; and
an orchestration layer comprising an orchestrator component that directs the real time information to and from the software application.

8. The method of claim 6 further comprising:
storing, in data storage by the first cluster, for processing with the software application, the first main version of the application data of the first cluster as the first topic; and
storing, in the data storage by the first cluster, for processing with the software application, the second replica version of the application data of the second cluster as the second topic.

9. The method of claim 7 wherein the orchestrator component provides the second replica version of the application data from the second cluster for storage and processing by the software application in real time, such that the software application in the first cluster can execute all processing requiring current data from the second cluster, even when the second cluster experiences a failure in sharing updated application data.

10. The method of claim 7 further comprising:
synchronizing, in real time, via the orchestrator component: (i) the second replica version of mirrored in the first cluster with the second main version of the second cluster, and (ii) the first replica version mirrored in the second cluster with the first main version of the first cluster.

11. A computer-implemented method comprising:
operating plural instances of a search application comprising:
operating, by one or more first computers of a first cluster associated with a first cloud computing environment, a first instance of the search application in the first cluster; and
operating, by one or more second computers of a second cluster associated with a second cloud computing environment, a second instance of the search application in the second cluster;
wherein the first cluster is operationally distinct from the second cluster;
assessing, by at least one processor, one or more requirements of streaming architecture of both the first cluster and the second cluster that impact ability of the first instance and the second instance to process versions of application data in both the first cluster and the second cluster;
creating, by the one or more first computers of the first cluster and by the one or more second computers of the second cluster, respectively, at least two versions of the application data regarding the search application, the at least two versions of the application data including a first main version stored in at least one first database and a first replica version configured for transmission to one or more operationally distinct clusters, and a second main version stored in at least one second database and a second replica version configured for transmission to at least one of the one or more operationally distinct clusters;
storing, by the first cluster, for processing with the search application, the first main versions of the application data of the first cluster as a first topic; and
storing, by the first cluster, for processing with the search application, the second replica versions of the application data of the second cluster as a second topic;
wherein the versions of the application data are:
(1) indexed as a function of topics that facilitate mirroring the first replica version and the second replica version in the one or more operationally distinct clusters; and
(2) aligned based on the one or more requirements such that each of the first replica version and the second replica version:
(i) mimics the application data and alignments of the first main version and the second main version, respectively;
(ii) provides consistent response and mimics a same functionality, as the first main version and the second main version, respectively, when executed by a respective instance of the software application residing in any of the one or more operationally distinct clusters, wherein the application data of each of the first replica version and the second replica version is configured to produce a same result when executed by the respective instance of the software application in any of the one or more operationally distinct clusters to provide the consistent response;

automatically mirroring, in real time:
- (i) by one or both of the one or more first computers and the one or more second computers, the first replica version of the application data in the first cluster to the second cluster for access and use by the second instance; and
- (ii) by one or both of the one or more first computers and the one or more second computers, the second replica version of the application data in the second cluster to the first cluster for access and use by the first instance;

locally storing, by the one or more first computers of the first cluster and by the one or more second computers of the second cluster, all data that the software application requires to provide consistent responses in the one or more operationally distinct clusters, including:
- (i) a set of indexes by which the first and second main versions and the first and second replica versions of the application data are indexed; and
- (ii) one or more of the first and second replica versions of the application data that are synchronized, in real time, with current processing of one or more of the first and second main versions within the one or more operationally distinct clusters.

12. The method of claim 11 wherein both the first cluster and the second cluster are configured to process at least one main topic for each cluster, wherein application data for the at least one main topic of each cluster are defined and processed as one or more main versions, and the application data for one or more secondary topics of each cluster are defined and processed as one or more replica versions.

13. The method of claim 11 wherein the second replica version mirrored in the first cluster is synchronized in real time with the second main version of the second cluster, and the first replica version mirrored in the second cluster is synchronized in real time with the first main version of the first cluster.

14. The method of claim 11 wherein the respective instance of the search application, in each cluster, is:
- (i) coupled to a local consumer associated with the first cluster, and a remote consumer associated with the second cluster that is remote; and
- (ii) configured to, in an event that a remote instance of the search application in the second cluster becomes unavailable due to an operational failure of a remote cloud computing environment hosting the second cluster, provide all functionality of the remote instance in an up-to-date manner using updates mirrored to the search application via a remote consumer instance.

15. The method of claim 14 further comprising, upon occurrence of the operational failure of the remote cloud computing environment:
updating the application data of the second topic with updated data generated by the search application during the operational failure of the remote cloud computing environment; and
updating the remote instance with the updated data when the operational failure ends and the remote cloud computing environment becomes operational.

16. The method of claim 11 wherein each of the operationally distinct clusters comprises:
a web layer configured to communicate information, in real time, between the operationally distinct clusters, wherein the information includes the first and second replica versions and is utilized to execute the search application; and
an orchestration layer comprising an orchestrator component that directs the real time information to and from the search application.

17. The method of claim 16 wherein the orchestrator component provides the second replica versions of the application data from the second cluster for storage and processing by the first instance of the search application in real time, such that the first instance of the search application in the first cluster can execute all processing requiring current data from the second cluster, even when the second cluster experiences a failure in sharing updated application data.

18. The method of claim 16 further comprising:
synchronizing, in real time, via the orchestrator component: (i) the second replica version mirrored in the first cluster with the second main version of the second cluster, and (ii) the first replica version mirrored in the second cluster with the first main version of the first cluster.

19. The method of claim 12 wherein the respective instance of the search application, in each cluster, is:
- (i) coupled to a local consumer associated with the first cluster, and a remote consumer associated with the second cluster that is remote; and
- (ii) configured to, in an event that a remote instance of the search application in the second cluster becomes unavailable due to an operational failure of a remote cloud computing environment hosting the second cluster, provide all functionality of the remote instance in an up-to-date manner using updates mirrored to the search application via a remote consumer instance.

20. The method of claim 19 further comprising, upon occurrence of the operational failure of the remote cloud computing environment:
updating application data of the second topic with updated data generated by the search application during the operational failure of the remote cloud computing environment; and
updating the remote instance with the updated data when the operational failure ends and the remote cloud computing environment becomes operational.

* * * * *